United States Patent [19]

Botcharoff

[11] 3,905,920
[45] Sept. 16, 1975

[54] OZONE GENERATING DEVICE

[76] Inventor: Jacqueline N. Botcharoff, 97 rue des Moines, 75017 Paris, France

[22] Filed: Mar. 29, 1974

[21] Appl. No.: 456,263

[30] Foreign Application Priority Data
Apr. 6, 1973 France .............................. 73.12427

[52] U.S. Cl.................. 250/536; 250/532; 321/8 R
[51] Int. Cl........................ C01b 13/12; H02m 7/00
[58] Field of Search............................ 250/535, 536

[56] References Cited
UNITED STATES PATENTS

| | | | |
|---|---|---|---|
| 1,864,174 | 6/1932 | Davis ................................... | 250/536 |
| 2,290,376 | 7/1942 | Marshall .............................. | 250/535 |
| 2,350,842 | 6/1944 | Tsuno .............................. | 250/536 X |
| 2,615,841 | 10/1952 | Thorp et al. ......................... | 204/176 |
| 2,778,795 | 1/1957 | Trub ................................... | 250/536 |
| 3,400,071 | 9/1968 | Zwoboda ............................ | 250/536 |
| 3,455,803 | 7/1969 | Miller .................................. | 204/176 |
| 3,784,838 | 1/1974 | Lowther.............................. | 250/536 |
| 3,800,210 | 3/1974 | Caussin................................ | 321/9 R |

FOREIGN PATENTS OR APPLICATIONS

| | | | |
|---|---|---|---|
| 686,568 | 5/1964 | Canada................................ | 250/535 |

Primary Examiner—John H. Mack
Assistant Examiner—Aaron Weisstuch
Attorney, Agent, or Firm—Diller, Brown, Ramik & Wight

[57] ABSTRACT

An ozone generating device having an ozone generating tube and adapted to be inserted in a socket for a cigar-lighter in the dashboard of a motor vehicle. The device is cylindrical in shape with a base to be received in the socket and having terminals electrically connected to a power supply which in this case is the battery for a motor vehicle. At the end of the casing opposite the base a perforate cap for protecting the tube against impacts is provided. A D.C./A.C. solid-state converter is housed in the base of the casing for raising the relatively low battery voltage to a relatively high supply voltage for the tube which may be an argon tube for example. Means may be provided for supplying the device from an A.C. power supply line instead of the battery.

13 Claims, 4 Drawing Figures

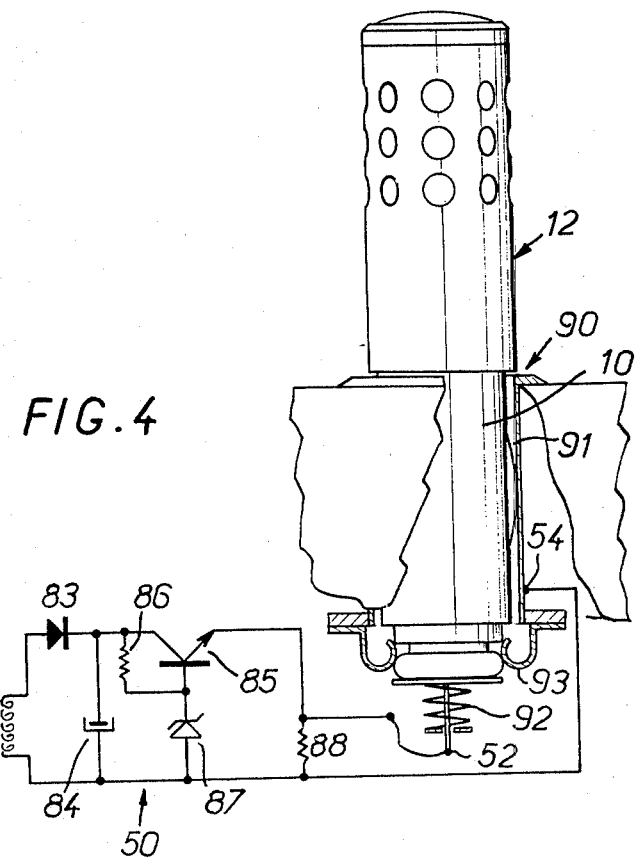

OZONE GENERATING DEVICE

The present invention relates to a compact device for generating ozone in an environment which is intended to be breathed, and having low current consumption which may be supplied by batteries as well as household current.

According to the invention, an ozone generating device may be provided having the size and shape of a cigar-lighter for a motor vehicle dashboard for which it may be substituted without other modifications or additions. Such an ozone generating device could also be inserted into a power pack having a suitable socket so as to be portable for use on conference tables, in trailers and camping tents, etc., or in combination with other means for medical or public health purposes.

The beneficial effects of small amounts of ozone in the air one breathes are well known, and can be summarized as follows: deodorizing effects, bacteria destroying properties, and refreshing effects, etc. Ozone may be included in the category of elements intended to reduce the harmful effects of pollution, including tobacco smoke.

According to the invention an ozone generating device is provided including an ozone generating tube for electrically generating ionizing radiation from a low-voltage power supply, comprising a generally hollow cylindrical casing, one end of the casing forming a base having connecting means adapted to cooperate axially with support means having complementary connecting means and electrically connected to the low-voltage power supply, converter means housed inside the base, said converter means being adapted to convert the low-voltage of the power supply into a supply voltage suitable for the ozone generating tube, the ozone generating tube being disposed along the axis of the casing spaced from the converter means.

The above-mentioned ozone generating tube may be a discharge, or non-discharge, ionizing radiation generating tube, a tube for producing ultraviolet rays, or any other means adapted to generate ozone by ionization which does not take up much room and has a satisfactory efficiency.

As defined hereinabove, the device according to the invention may be of very compact construction in a generally cylindrical casing of small dimensions having a rear portion or base for detachably securing and electrically connecting the casing to a suitable support or holder; the cap or forward end of the casing which contains the tube itself and protects the latter against impacts may be conveniently held between the thumb and the forefinger for example, for inserting the device into or removing the device from its support or holder.

According to a preferred embodiment of the invention, the base of the casing is adapted to cooperate with the socket usually provided for a cigar-lighter in automobiles and for this purpose may have a generally circular metal contact stud which in combination with the lateral surface of the metal base forms a male plug which enables the ozone generating device or ozonizer to be instantaneously electrically connected to the battery of vehicle by exerting an axial force on the casing.

The corresponding female socket in most motor vehicles is provided on the dashboard near the driver's seat, i.e., a position which is perfect for the ozonizer.

Various features and advantages of the invention will become apparent from the following description, given by way of non-limiting example, with reference to the accompanying drawings, in which:

FIG. 4 is a circuit diagram of a device for supplying the converter from an A.C. power line.

Figure 1:
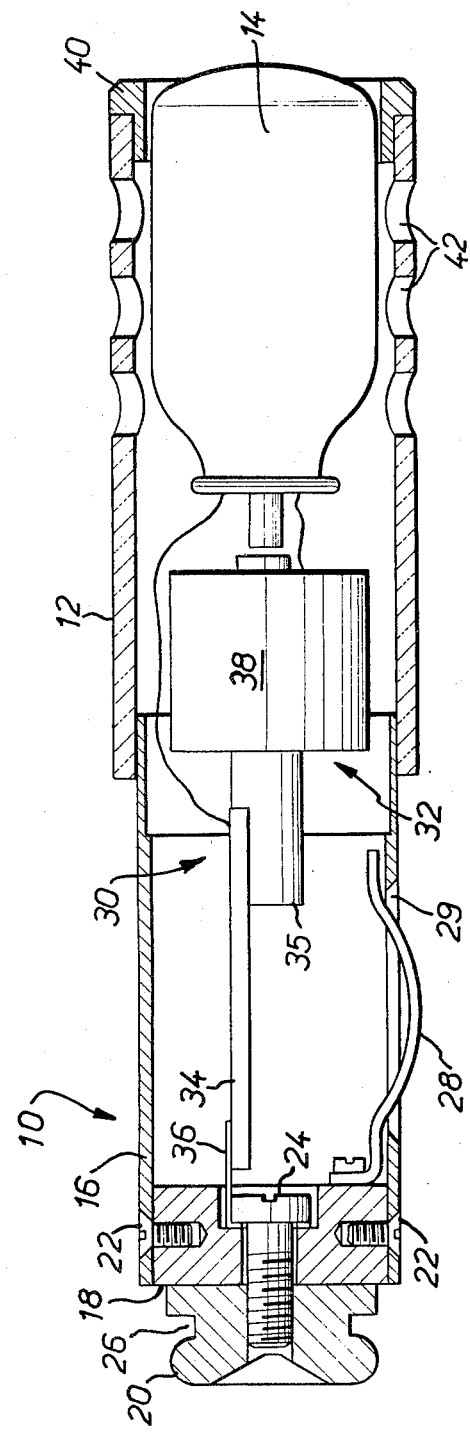
FIG. 1 is a simplified axial cross-sectional view of a preferred embodiment of the invention.

According to the embodiment illustrated in FIG. 1, the ozone generating device or ozonizer has a general overall hollow cylindrical configuration adapted to be received in the socket (shown in FIG. 4) for a cigar-lighter in a motor vehicle, and for this purpose, comprises a cylindrical base 10 forming the plug adapted to be inserted axially for the major portion of its length into the corresponding socket so that only the cylindrical cap 12 which is an axial continuation of the base 10 for protecting the gas discharge tube 14 against impacts protrudes beyond the receptacle formed by the socket.

The base 10 comprises a metal tube 16 closed off at its free end with a closure disc 18 of electrically insulating material; a metal contact stud or terminal 20 is fastened to the outer face of disc 18, coaxially with the metal tube 16. The disc 18 is fastened to the metal tube 16 by two lateral screws 22, and the terminal 20 is secured by a cap screw 24. The contact stud 20 is of generally knoblike shape with an annular groove 26, known per se. Further, the base 10 is provided with a pressure spring 28 having a curved portion which projects radially outside the tube 16 through a longitudinal slot 29 for effecting a suitable radial clamping of the device in the socket providing the receptacle and support therefor.

The contact stud 20 and the metal tube 16 thus form the two terminals of a plug for ensuring supply to D.C./A.C. converter 30 arranged in the base 10 and providing the discharge tube 14 with the required supply voltage. This D.C./A.C. converter will be described hereinafter in greater detail, and for the sake of clarity, only the transformer 32 and the printed circuit board 34, on which components are mounted, are illustrated.

The printed circuit board 34, shown in side elevation, in FIG. 1, is arranged in a plane parallel to the axis of the metal tube 16 and fixed at one of its edges by a right-angle metal lug 36 fastened to the insulating disc 18 by a screw 24. This lug 36 is in electrical contact with the contact stud 20 and forms one of the low-voltage current paths supplying the D.C./A.C. converter 30, the second current path being formed by a ground wire (not shown) connecting the converter to the metal tube 16.

The transformer 32 disposesd generally along the axis of the device between the discharge tube 14 and the printed circuit board 34 to which is secured the cylindrical magnetic core 35 of the transformer coils generally designated by the reference numeral 38 being wound around the core.

The cap 12 which is a longitudinal continuation of the base 10 has an inner diameter substantially equal to the outer diameter of the tube 16 on which it is adapted to fitted; the forward end of the cap 12 threadedly engages an end ring 40. The ring 40 ensures the centering and the axial positioning of the lamp 14 disposed along its axis. Perforations 42 are provided along the entire periphery of the cap 12 to permit the molecules of ozone which form around the outer surface of the tube 14 to diffuse freely in the ambient atmosphere.

In the present case, the tube 14 is of a known type with diffuse electric discharge in a high pressure gas, such as argon, and its operation is accompanied with light which is visible from the open front end of the cap 12.

Before describing the D.C./A.C. converter 30 in detail, it should be noted that in the present embodiment the tube 14 is normally supplied with a high voltage, in the order of 3000 volts, the choice of which depends, however, on various parameters adapted to its structure and size. It has been found that the efficiency of ozone production of such a tube depends principally on the time waveform of the electric supply signals applied thereto. Preferably, these signals are short pulses having intervals between one another at least as long as the mean de-ionization time of the gas contained in the tube, which is generally in the order of 1–3 milliseconds, which requires the same length of time to reach maximum ionization. In order to work under the best efficiency and power conditions, I was led to employ pulses having a recurrence frequency between 100 and 200 Hz and a working time ratio (i.e. duty cycle) between 1/5 and 1/15. For a high-pressure commercially available argon tube, a recurrence frequency of 130–150 Hz and a working time ratio between ⅛ and 1/10 have been found to yield very good results.

Preferably, each of the above-mentioned pulses comprises a train of frequency oscillations several times greater than the pulse per se, which enables the conversion efficiency of the converter to be increased as well as a very substantial reduction in the weight and the size of the transformer 32. In this embodiment, the frequency of these oscillations is of the order of 10 KHz; each of the pulses therefore consists of a plurality of consecutive oscillations.

Figure 2:
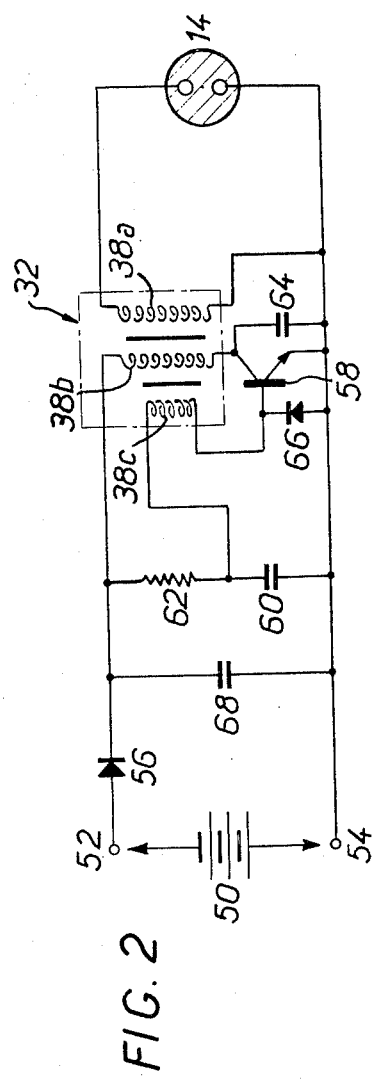
FIG. 2 is a circuit diagram of the D.C./A.C. converter for the device illustrated in FIG. 1.

The D.C./A.C. converter 30 whose circuit diagram is shown in FIG. 2, is adapted to provide an output voltage in accordance with the characteristics which have just been defined, starting with a battery 50 of a motor vehicle or another power supply to which input terminals schematically represented in FIG. 2 as 52 and 54 and corresponding respectively to the central contact stud 20 (FIG. 1) and the metal tube 16, the metal tube being the ground terminal.

The tube 14 is connected directly to the secondary winding 38a of the transformer 32 which also includes a primary winding 38b which is connected to the terminal 52 through a blocking diode 56 and to the collector of an oscillator transistor 58, the transformer further comprising a feedback winding 38c connected to the base of the transistor 58 and R.C. time constant circuit comprising a capacitor 60 and resistor 62 connected according to the circuit diagram.

The characteristic frequency of the oscillations of the transformer is determined by the series L.C. oscillatory circuit comprising the winding 38b and the capacitor 64 between the collector of the transistor 58 and the ground, the frequency being selected in the order of 10 kHz for the reasons set forth above, whereas the relaxation frequency of the oscillator, between 130 and 150 Hz, is determined by the time constant of the R.C. circuit including the capacitor 60 and the resistor 62. The arrangement is rounded out with a diode 66 between the base of the transistor 58 and the ground for preventing the appearance of inverted voltages which are dangerous for the transistor, and a by-pass capacitor 68, disposed between the output of the diode 56 and the ground, for eliminating interference in the arrangement and preventing the supply voltage from dropping during the peaking of the collector current of the transistor 58.

Naturally, the discharge tube 14 could be associated with a conventional converter providing a constant amplitude A.C. voltage or even a D.C. voltage, but the overall efficiency of the device, expressed in terms of the ratio of the mass of ozone formed per unit of time to the electric power consumed, would substantially diminish.

Figure 3:
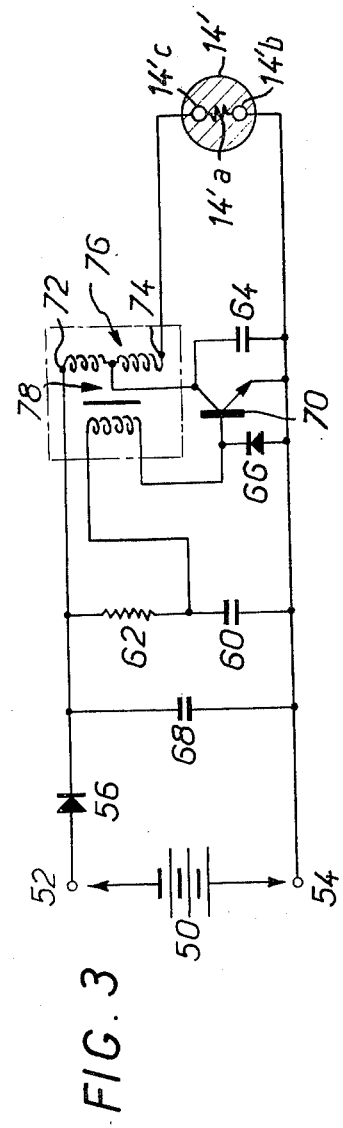
FIG. 3 illustrates a circuit diagram for another D.C./A.C. converter.

FIG. 3 illustrates an alternative embodiment of the D.C./A.C. converter 30 which is useful particularly in case the ozone generating tube is also of another known type having two electrodes between which an ionizing discharge may be produced at a relatively low voltage, in mercury vapor for example. This voltage is relatively low, although greater than that of the battery supplying the device, owing to a heating filament 14'a which is connected to the electrodes 14'b and 14'c of such a tube designated in FIG. 3 by the reference numeral 14'.

Insofar as arrangement itself of the oscillator transistor 70, the D.C./A.C. converter in FIG. 3 is identical to that of FIG. 2, and it also produces consecutive trains of oscillations separated by relaxation periods described hereinabove. However, the output A.C. voltage thereof is not tapped at the terminals of an independent winding but at the end terminals 72 and 74 of a common winding 76 having an intermediate tap 78 connected to the collector of the transistor 70 thus defining an autotransformer. The tube 14' is electrically connected between the terminal 74 and the ground. Under these circumstances, the voltage applied to the tube 14' is the sum of the D.C. voltage at the terminals of the battery 50 and the A.C. voltage produced between the terminals 72 and 74 of the winding 76, thereby the converter only provides a part of the total power supply for the tube. It goes without saying that the converter of FIG. 3 may be associated just as advantageously with a relatively low supply voltage discharge tube without a filament, advantages of such a tube compared to the converter of FIG. 2 are only considerable when the supply voltage for the tube 14' or other ozone generating device is not very much greater than that furnished by the power supply which for the converter of FIG. 2 as well as that of FIG. 3 may be an A.C. power supply such as from an A.C. Power line.

For supplying an ozone generating device according to the invention from such an A.C. Power line, the ozone generating device could be arranged in a supply circuit such as shown in the circuit diagram of FIG. 4. A transformer 80 is supplied by an A.C. power supply through a switch 81 and a branch fuse element 82. The secondary voltage is rectified by a diode 83 and charges a capacitor 84. The rectified voltage is carried to the terminals 52 and 54 of the socket 90 through a voltage stabilizing circuit including a series transistor 85, the base voltage of which is determined by a zener diode 87 and a series resistor 86. A ballast resistor 88 is disposed between the emitter and the negative side of the rectifier. The socket 90 for receiving the base of the converter is a conventional socket for automobile cigar-lighters and comprises a sleeve 91 electrically connected to the negative terminal 54 of the power supply and a separate contact stud 92 biased by a spring and electrically connected to the positive terminal 52 of the power supply. The resilient clips 93 which come into engagement with the annular groove 26 in the contact stud 20 maintain the ozone generating device in contact.

When supplying the ozone generating device with A.C. current namely for use in households or public health in public buildings, hospitals, and the like, the use of the converter according to the invention produces increased ozone production efficiency as well as reducing the cost with reduced weight and space. In such applications, the amount of ozone could be adjustable by means adapted to vary the recurrence frequency and/or the working time ratio of the supply pulses for the discharge tube, and for this purpose, a variable resistor may be provided which is adapted to vary the mean base voltage of the transistor of the converter and/or the time constant of the R.C. circuit determining the relaxation frequency.

According to a particularly interesting aspect of the invention, the ozone generating tube may be a conventional argon or neon filled lamp commonly employed as a signal lamp but not at the present used as an ozone generating tube.

What we claim is:

1. An ozone generating device comprising, in combination:
   support means for providing d.c. voltage connections;
   a generally hollow cylindrical casing having one end forming a base having connecting means for axial cooperation with said support means electrically to connect with said d.c. voltage connections;
   converter means disposed within said casing adjacent said base for converting said d.c. voltage to a.c.; and
   an ozone generating tube disposed along the axis of said casing and spaced from said converter means;
   said converter means comprising transformer means for supplying high a.c. voltage pulses to said tube, oscillator means for energizing said transformer means at a first frequency and at a fractional duty cycle whereby said transformer means is energized only intermittently, and capacitor means connected in series with a winding portion of said transformer means for providing a resonant frequency of said high a.c. voltage which is several times greater than said first frequency.

2. An ozone generating device according to claim 1, wherein the support means is a socket for a motor vehicle cigar-lighter.

3. An ozone generating device according to claim 2, wherein said connecting means comprise a contact stud disposed at the free end of the base and insulated therefrom, and an electrically conductive tube forming the side wall of the base.

4. An ozone generating device according to claim 3, wherein the casing further comprises a perforate cylindrical cap extending the casing away from the base, and wherein the ozone generating tube is housed in the cap.

5. An ozone generating device according to claim 1, wherein the converter means comprises a solid-state D.C./A.C. converter.

6. An ozone generating device according to claim 1 wherein the tube receives the voltage supplied by the converter means in addition to the voltage supplied by power supply.

7. An ozone generating device as defined in claim 1 wherein said duty cycle is between 1/5 and 1/15.

8. An ozone generating device as defined in claim 1 wherein said first frequency is between 100 and 200 Hz.

9. An ozone generating device as defined in claim 8 wherein said duty cycle is between 1/5 and 1/15.

10. An ozone generating device as defined in claim 1 wherein said oscillator means comprises an oscillator transistor having a base electrode, a series R.C. circuit connected across said d.c. voltage connections, the junction between the elements of said R.C. circuit series connected through a winding of said transformer to said base electrode.

11. An ozone generating device as defined in claim 1 wherein said first frequency is between 130 and 150 Hz, said duty cycle is between ⅛ and 1/10 and said resonant frequency is in the order of 10 K Hz.

12. An ozone generating device as defined in claim 1 wherein said oscillator means comprises an oscillator transistor having a base electrode and an emitter-collector path in parallel with said capacitor, and a series R.C. circuit connected across said d.c. voltage connections, said transformer means having a secondary winding connected to said ozone generating tube, a primary winding which constitutes said winding portion and which is connected in series with said emitter-collector path and a feedback winding connecting the junction between the elements of said R.C. circuit to said base electrode.

13. An ozone generating device as defined in claim 1 wherein said oscillator means comprises an oscillator transistor having a base electrode and an emitter-collector path in parallel with said capacitor, and a series R.C. circuit connected across said d.c. voltage connections, said transformer means being an autotransformer having said winding portion and a further winding portion on a common core, said further winding portion being connected to said tube and said winding portion being connected in series with said emitter-collector path, and a feedback winding connecting the junction between the elements of said R.C. circuit to said base electrode.

* * * * *